United States Patent [19]

Cargille

[11] 4,432,060
[45] Feb. 14, 1984

[54] EARTH CENTER POINTING PHASE LOCKED HORIZON SENSOR ELECTRONIC LOOP

[75] Inventor: Donald R. Cargille, Venice, Calif.

[73] Assignee: Hughes Aircraft Company, El Segundo, Calif.

[21] Appl. No.: 231,210

[22] Filed: Feb. 4, 1981

[51] Int. Cl.³ .......................... G06F 15/50; G01J 1/00
[52] U.S. Cl. .................................... 364/434; 250/347; 328/133
[58] Field of Search ........................ 364/432, 434, 449; 244/3.16, 3.17, 3.18; 328/133, 134, 155; 307/511, 516; 250/338, 342, 347

[56] References Cited

U.S. PATENT DOCUMENTS

| | | | |
|---|---|---|---|
| 3,519,823 | 7/1970 | Heller et al. | 250/347 |
| 3,920,994 | 11/1975 | Cargille | 250/347 |
| 3,936,629 | 2/1976 | Desvignes | 250/347 X |
| 3,991,378 | 11/1976 | Schaefer | 307/511 X |
| 4,055,814 | 10/1977 | Abraham et al. | 328/133 X |
| 4,328,421 | 5/1982 | Falbel | 250/347 |

Primary Examiner—Jerry Smith
Attorney, Agent, or Firm—Leonard A. Alkov; A. W. Karambelas

[57] ABSTRACT

An electronic logic circuit utilized in conjunction with a scanning infrared detector to generate pulses which accurately indicate the precise location of the center of a preselected astronomical radiant body, such as the earth, notwithstanding a wide scanning frequency range with unknown initial value, and capable of rejecting undesirable input signals, is disclosed. The pulses are initially generated so as to conform the frequency of a generated signal to that of the signal applied from the infrared detector, thereby correcting the large initial signal frequency error. Both the conditions of an initially high and low frequency of oscillation of the generated signal relative to the applied signal are corrected. After such frequency correction has been rendered, signal phase correction is accomplished so as to negate the difference between the exact center of the signal applied from the infrared sensor and the trailing edge of the generated signal. The system has a variety of applications in the celestial environment, and especially with use an earth-orbiting satellite, in order to produce error signals which are utilized to correct the flight attitude of the satellite, to produce antenna-positioning steering signals, and to generate other guidance and timing quantities.

4 Claims, 20 Drawing Figures

| INPUT SIGNALS | | OUTPUT SIGNALS | |
|---|---|---|---|
| A | B | · | + |
| 0 | 0 | 0 | 0 |
| 0 | 1 | 0 | 1 |
| 1 | 0 | 0 | 1 |
| 1 | 1 | 1 | 1 |

EARTH CENTER POINTING PHASE LOCKED HORIZON SENSOR ELECTRONIC LOOP

BACKGROUND OF THE INVENTION

1. Field of the Invention

This invention relates to astronomical body center tracking horizon sensors and more specifically to phase locked electronic circuit loops utilized in conjunction therewith.

2. Description of the Prior Art

Spacecraft, such as earth-orbiting satellites, generally require a sensing means coupled to a measurement device that produces error signals which can be utilized to correct the flight attitude of the spacecraft, to produce antenna-positioning steering signals, and to generate other guidance and timing quantities. For spacecraft which operate in close proximity to radiant astronomical bodies, a body center tracking horizon sensor operating in the infrared spectrum is often used.

A body center tracking horizon sensor is generally composed of an infrared sensor, as the sensing means, a spinning spacecraft, as the scanning means, and an earth center pointing phase locked horizon sensor electronic loop, as the measurement device. An earth center pointing phase locked horizon sensor electronic loop operates, in general, in the following manner. The frequency of an output signal of the earth center pointing phase locked horizon sensor electronic loop, which signal has the lowest subharmonic frequency of an oscillator in the electronic loop, wherein a subharmonic frequency is defined as the fundamental frequency of an oscillator divided by a positive, non-zero integer, N, is matched to the frequency of the signal input from the infrared sensor by applying an appropriate voltage to the oscillator, the magnitude of which depends upon the difference is frequency between the two signals. Errors in frequency normally occur only during the initial operation of a body center tracking horizon sensor. The phase angle of the output signal of an electronic oscillator is matched to that of the signal input from the infrared sensor by aligning the leading edge of the lowest subharmonic frequency output signal of the earth center tracking phase locked horizon sensor circuit to the center of the infrared sensor output signal by applying a voltage signal to the oscillator which is the output of a loop shaping filter, the input of the filter being proportional to the difference in phase angle between the two signals. The difference in time between the crossings of the two horizons of a radiant astronomical body, as sensed by the infrared sensor, is utilized by an earth center tracking logic circuit in conjunction with the lowest subharmonic oscillator output signal to generate the appropriate voltage signals which are applied to the oscillator. Phase angle correction occurs throughout the operation of the body center tracking horizon sensor, after frequency correction has been rendered. Based upon this operation, body center pointing can be accomplished; that is, the precise center of a preselected radiant astronomical body, such as the earth, can be accurately determined. It is apparent that in order to effectively accomplish earth center pointing in the celestial environment, infrared spectra from other than the pre-selected astronomical bodies in the scan path sensed by the body center tracking horizon sensor device must be ignored. Furthermore, relatively large initial input errors must be overcome, so that the device can rapidly acquire the center of the earth for the hereinbefore stated purposes. These initial input errors result from relatively large initial spacecraft spin frequency variations.

Infrared horizon sensors have been designed and built which utilize electronic circuits which feature moon and sun infrared spectra rejection. An example of such a device is described in U.S. Pat. No. 3,920,994 issued to D. R. Cargille on Nov. 18, 1975. Other infrared horizon sensors have been designed and built in which earth center pointing is featured. However, the electronic circuitry of said devices have no infrared spectra rejection capability. Furthermore, such devices are only capable of acquiring the center of the earth for a relatively restricted range of input signal frequency errors, on the order of ±10%.

The advantage of the present invention is to combine the capability of accurate earth center pointing with sun and moon infrared spectra rejection and with the capability to pull-in to a phase locked condition despite an initial frequency error on the order of two-to-one. The novelty of the present invention is to simultaneously accomplish these functions.

Accordingly, it is a general purpose of the present invention to provide an earth center pointing phase locked horizon sensor electronic loop operating in the infrared spectra environment.

It is another purpose of the invention to provide a horizon sensor which rejects moon and sun infrared spectra.

Yet another purpose of the invention is to provide an infrared horizon sensor which is capable of acquiring the center of the earth for an initial input error of magnitude on the order of two-to-one.

SUMMARY OF THE INVENTION

In keeping with the principles of the present invention, the purposes are accomplished with the unique combination of an electronic earth center tracking logic circuit, which responds to input signals from an infrared sensor and a feedback signal from a voltage controlled oscillator, three of the output signals of which are applied as input signals to an analog error generator which produces either positive or negative voltage signals in response to the input signals, and another of the output signals which is applied to a sample-and-hold (S/H) device which provides sampled voltage signals in response to the positive or negative voltage signals of the analog error generator, an electronic loop filter which produces filtered voltage signals in response to the sampled voltage signals, a voltage controlled oscillator (VCO) which produces a frequency in response to the filtered voltage signals, and a divide-by-N counter which produces a plurality of specified subharmonic frequencies, $2^{(N-1)}F$, $2^{(N-2)}F$, ... $2F$, $F$, proportional to the VCO output signal with fundamental frequency, $2^N F$, the lowest subharmonic frequency signal F being applied to the electronic earth center tracking logic circuit as a feedback signal. The electronic earth center tracking logic circuit produces signals which are used to position the falling edge of the lowest subharmonic applied VCO feedback signal relative to the center of the applied infrared sensor signal and rejects portions of the applied input signals which are narrower than a prescribed pulse width range. A sequence of flip-flops in combination with a delay device and logic gates are used to transform the applied infrared sensor and VCO feedback signals into signals which (1) indicate the duration in time from the leading edge of the infrared sensor signal to the leading edge of the lowest subharmonic VCO output signal; (2) indicate the duration in time from the leading edge of the lowest subharmonic VCO output signal to the trailing edge of the infrared sensor signal; (3) indicate when the trailing edge of the infrared sensor signal occurs; and (4) indicate the absence of an applied signal from the infrared sensor. A pre-programmed counter device in combination with a delay device is used to count pulses applied from a timing clock generator, initiated by the leading edge of an infrared sensor output signal, in order to accomplish pulse width discrimination.

The earth center tracking logic circuit is comprised of a delay device which responds to input signals applied from an infrared sensor and produces signals which are applied along with a timing clock generator signal to a pre-programmed counter device which produces signals which are applied along with a VCO feedback to a sequence of flip-flops, which, in turn produce signals which are applied to a sequence of logic gates. The output signals from the sequence of logic gates are required by the analog error generator to control the duration of the positive and negative error voltage signals.

BRIEF DESCRIPTION OF THE DRAWINGS

The following specification and the accompanying drawings describe and illustrate an exemplification of the present invention. A complete understanding of the invention, including the novel features and purpose thereof, will be provided by consideration of the specification and drawings. Like reference characters are used to designate like parts throughout the figures of the drawings.

FIG. 1 is a perspective view of the earth, the sun, the moon, and an infrared horizon sensor associated with a satellite orbiting the earth. FIG. 1 also illustrates an earth-projected infrared input pattern of the type contemplated by this invention;

DESCRIPTION OF THE PREFERRED EMBODIMENT

Figure 1:
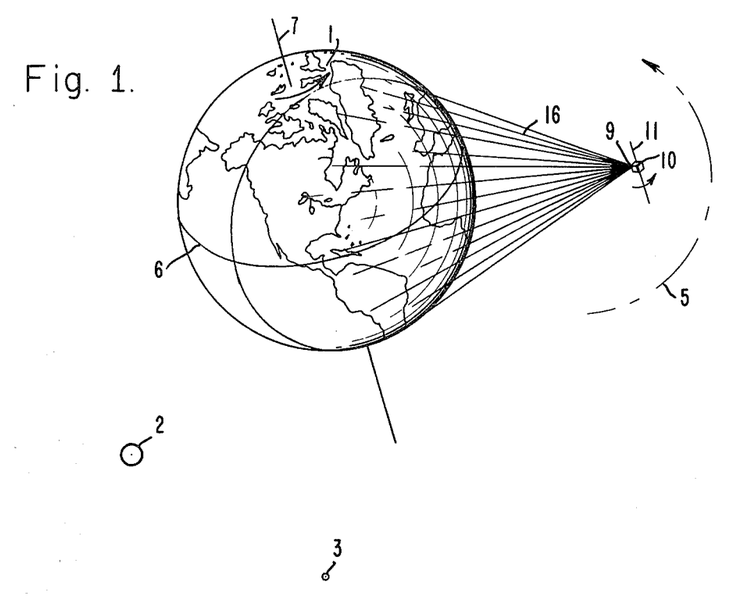

Referring now to FIG. 1, there is illustrated a space vehicle, such as satellite 10, traversing an orbit 5 about the earth 1. The satellite 10 is in an equatorial plane of the earth, that is a plane passing through the equator 6 and through the orbit 5 of the satellite 10. The satellite 10 travels in the same direction as the earth 1 does in rotating about its axis 7 and at the same angular velocity thereof. Thus, satellite 10 rotates with the earth 1 so as to remain stationary over a single geographic area thereof. Such an orbit 5 is commonly referred to as being of the synchronous, stationary, or 24-hour type. Although described with reference to a stationary orbit, the invention is also applicable to satellites in other than stationary orbits. The satellite 10 also spins about a spin axis 11, at an approximate $\frac{1}{2}$ Hz frequency, as it traverses the orbit 5 in order to provide attitude stabilization. The spin axis 11 of the satellite 10 is parallel to the earth's rotational axis 7. For other than equatorial orbits, the spin axis is aligned normal to the orbital plane.

FIG. 1 also illustrates an earth-projected infrared source pattern 16 detected by the infrared sensor 9 associated with the satellite 10. The earth's moon 2 and the sun 3 are illustrated to demonstrate the existence of other infrared sources which illuminate the infrared sensor when the associated satellite 10 is in a position different than that shown in FIG. 1. FIG. 1 is solely representative and is not to scale, the relative size of the satellite 10 to that of the earth 1, the earth's moon 2, the sun 3, and the distances therebetween being disproportionate for convenience.

Figure 12:
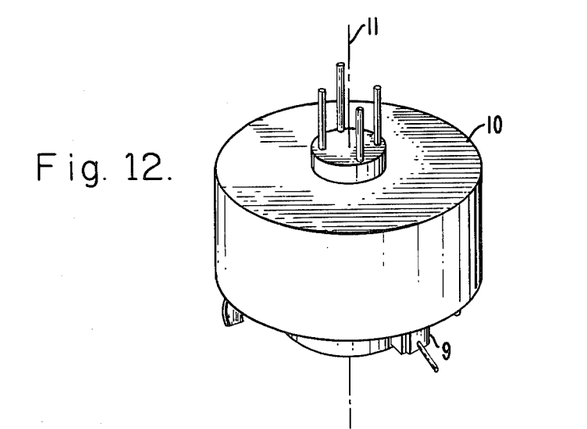
FIG. 12 is a representation of an earth-orbiting satellite with an infrared horizon sensor mounted in a typical location on the satellite.

FIG. 12 illustrates an earth-orbiting satellite 10 with an infrared horizon sensor 9 mounted in a typical location on said satellite. The earth center tracking phase locked horizon sensor electronic loop is itself located within satellite 10. Spin axis 11 of satellite 10 is also shown.

Figure 2:
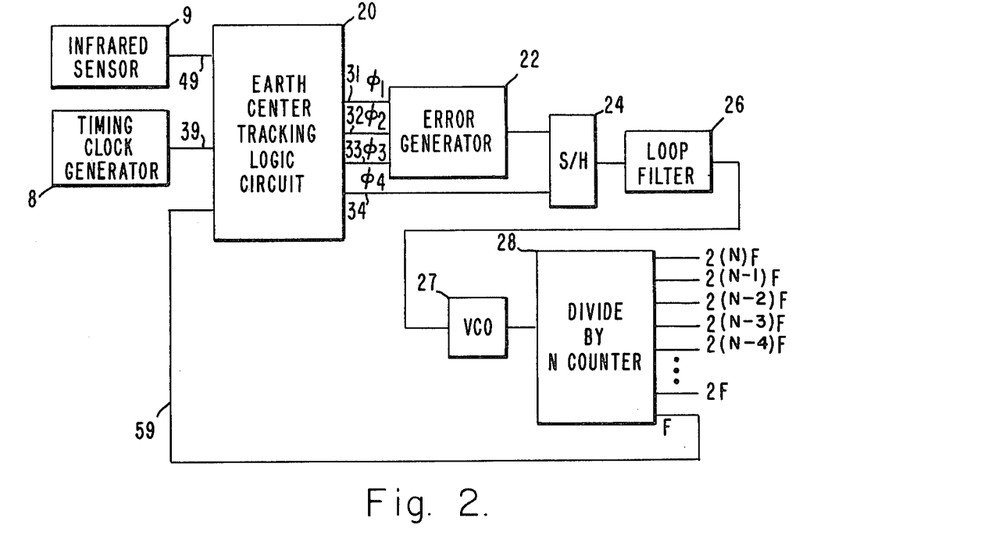
FIG. 2 is a block diagram of an earth center-tracking horizon sensor phase locked electronic circuit in accordance with the teaching of the present invention.

FIG. 2 is a block diagram of an earth center tracking phase locked horizon sensor electronic loop in accordance with the teachings of the present invention. FIG. 2 also illustrates infrared sensor 9. In FIG. 2, the earth center tracking phase locked horizon sensor electronic loop includes an electronic earth center tracking logic circuit 20 which responds to input signals applied from an infrared sensor 9 associated with satellite 10 and resulting from voltage controlled oscillator (VCO) 27. A clock timing input lead 39 is also coupled thereto from timing clock generator 8, which provides a standard reference signal for counting purposes. Four signals associated with output leads 31, 32, 33, and 34 are produced by the electronic earth center tracking logic circuit 20, three of which output leads 31, 32, and 33 are coupled to the input of analog error generator 22. The remaining output lead 34 is coupled along with the output lead of error generator 22 to the input of sample-and-hold (S/H) device 24. The output lead of S/H device 24 is coupled to the input of loop filter 26. The output lead of loop filter 26 is coupled to the input of voltage controlled oscillator (VCO) 27. The output of VCO 27 is coupled to the input of the divide-by-N counter device 28, which provides a plurality of output signal subharmonic frequencies, $2^{(N-1)}F$, $2^{(N-2)}F$, ... 2F, F, that are used as guidance and timing quantities, as for example, antenna steering signals. An output signal F from divide-by-N counter device 28, which is associated with the lowest subharmonic frequency of oscillation of VCO 27, is applied as a feedback signal on input lead 59 of electronic earth center tracking logic circuit 20.

Figure 3A:
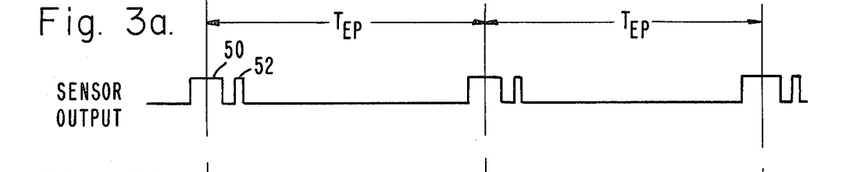
FIGS. 3a and 3b are a graphic representation of typical waveforms for the input signals applied to the earth center tracking logic circuit for the system in the phase locked condition.
Figure 3B:
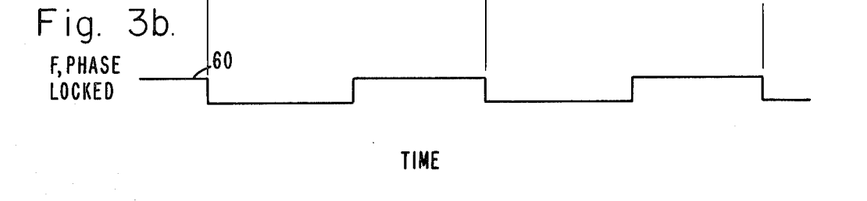
Figure 4A:
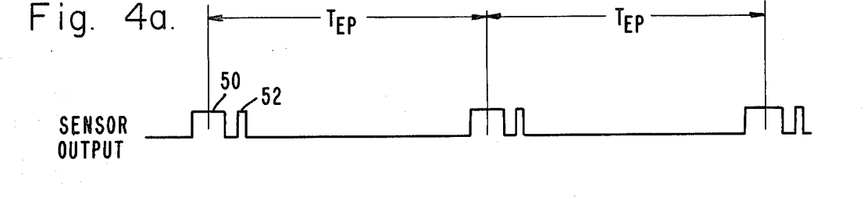
FIGS. 4a–4d are a graphic representation of typical waveforms for the input signals applied to the earth center tracking logic circuit for the system operating under initial conditions with a VCO "fast frequency" oscillation error.
Figure 4B:
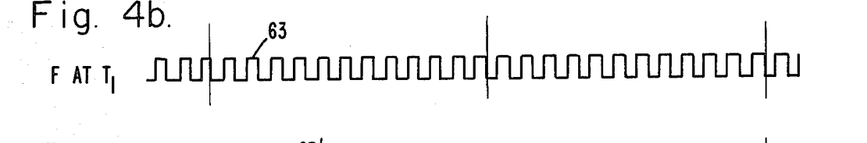
Figure 4C:
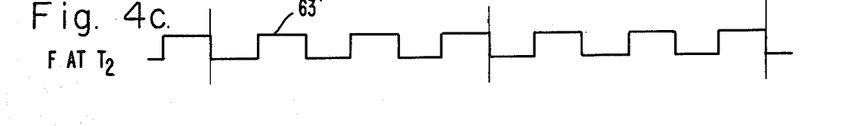
Figure 4D:
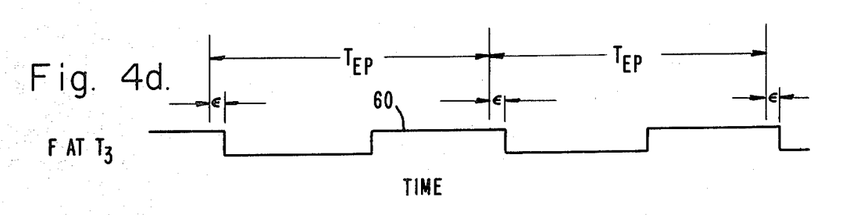

Referring now to both FIGS. 2 and 3, with reference also to FIG. 1, in operation the infrared sensor 9 associated with satellite 10 receives infrared radiation from radiant astronomical bodies, such as the earth 1, moon 2, and sun 3. The infrared sensor 9 associated with satellite 10 is scanned across radiant astronomical bodies by any type of scanning mechanism, as by the spinning of the satellite 10 or moving optical parts that produce scanning. The output signal associated with output lead 49 of the infrared sensor 9 resulting from an astronomical radiant-body projected infrared input patter, such as that shown by 16 in FIG. 1, is depicted in FIG. 3, by waveforms 50 and 52. Waveform 50 represents an output signal resulting from the infrared input pattern of the preselected radiant body, namely the earth 1; and waveform 50 is periodic, with a period, $T_{EP}$, which depends upon the spin rate of the satellite 10 about its own axis 11 and is normally on the order of $\frac{1}{2}$ Hz. Waveform 52 represents an undesirable output signal resulting from the infrared input pattern of an unselected radiant body, namely, the moon 2 or the sun 3, with pulses which are of shorter duration than those of the signal associated with waveform 50.

Output lead 49 of the infrared sensor 9 is coupled along with output lead 59 of the divide-by-N counter device 28, which lead is associated with the output signal F of the lowest subharmonic frequency associated with voltage controlled oscillator (VCO) 27, to electronic earth center tracking logic circuit 20. Waveform 60 of FIG. 3 depicts the output signal F of the VCO, which is the lowest subharmonic frequency signal of a plurality of subharmonic frequency signals generated by the VCO 27 in combination with the divide-by-N counter device 28, as applied to earth center tracking logic circuit 20, as a feedback signal on input lead 59.

Figure 5:
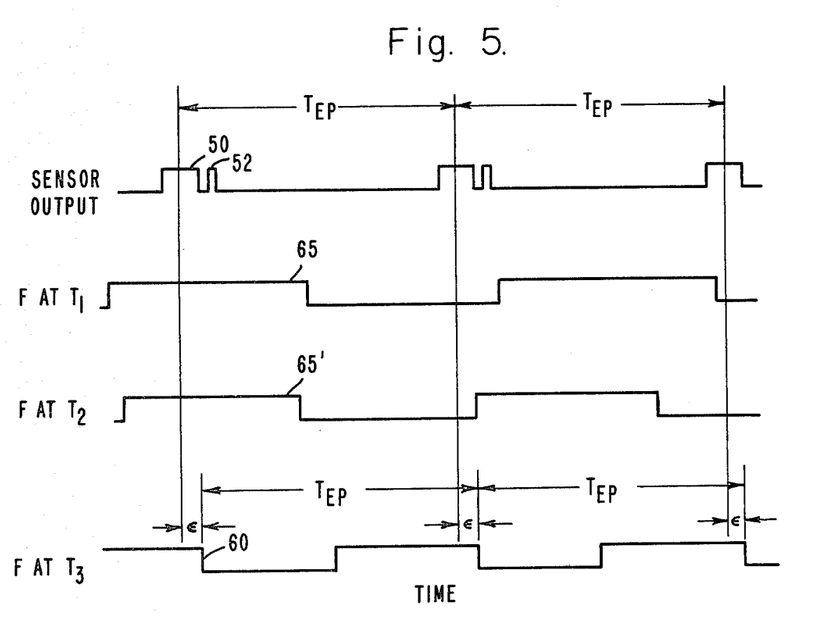
FIG. 5 is a graphic representation of typical waveforms for the input signals applied to the earth center tracking logic circuit for the system operating under initial conditions with a VCO "slow frequency" oscillation error.

The operation of the frequency correction capability of the invention is explained with reference to FIGS. 4 and 5. Frequency error of the VCO is measured relative to the frequency of the infrared sensor output signal, as represented by waveform 50, with period $T_{EP}$. FIGS. 4 and 5 depict the lowest subharmonic VCO output signal F, associated with lead 59, for two conditions of initial signal oscillation frequency error. For these two conditions, the lowest subharmonic VCO output signal frequency, as corrected by operation of the invention, is also depicted in FIGS. 4 and 5. A waveform 63 representation of a VCO oscillation frequency signal whose frequency is initially too high relative to $T_{EP}$ is depicted in FIG. 4 for time $t_1$. Earth center tracking logic circuit 20 generates output signal $\phi_1$ which when ultimately applied to VCO 27 tends to decrease the oscillation frequency signal as that depicted by waveform 63' in FIG. 4 for time $t_2$, and finally for time $t_3$, wherein the lowest subharmonic VCO output signal F matches the frequency, with the associated period $T_{EP}$, of that of the infrared sensor output signal, as depicted by associated waveform 60. Similarly, as depicted in FIG. 5, waveform 65 represents a VCO oscillation frequency signal whose frequency is initially too low relative to $T_{EP}$ for time $t_1$. Output signal $\phi_2$ is produced by earth center tracking logic circuit 20 which tends to increase the oscillation frequency signal, when the signals are ultimately applied to VCO 27, as that depicted by waveform 65' in FIG. 5 for time $t_2$, and finally for time $t_3$, wherein lowest subharmonic VCO output signal F matches the frequency, with associated period $T_{EP}$, of that of the infrared sensor output signal, as depicted by associated waveform 60. Further explanation of the operation of the frequency correction capability of the invention is given hereinafter in connection with the system state diagram of the invention of FIG. 8.

Figure 6:
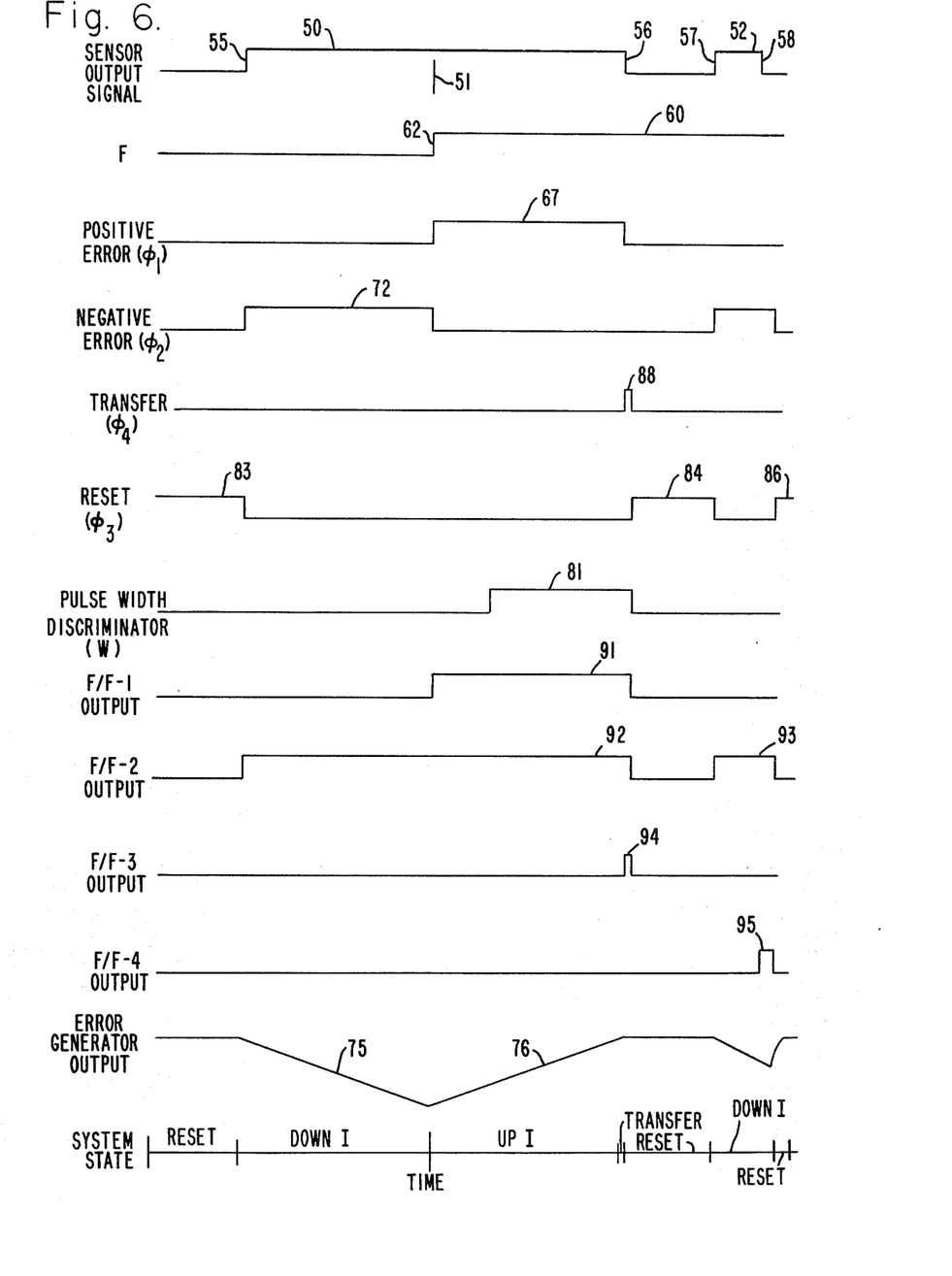
FIG. 6 is a graphic representation of typical waveforms at points in the block diagram of FIG. 2 for the system in the phase locked configuration.
Figure 7:
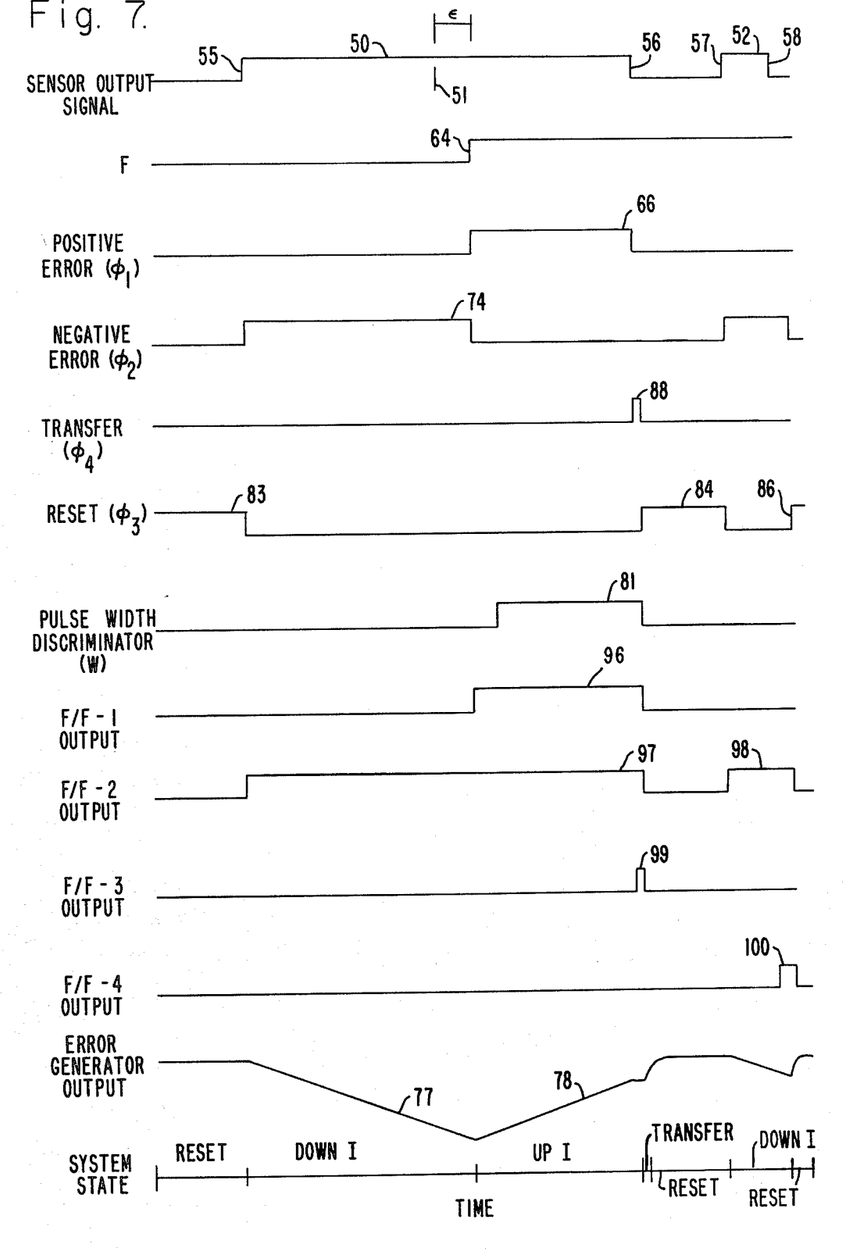
FIG. 7 is a graphic representation of typical waveforms at points in the block diagram of FIG. 2 when the system is not in the phase locked configuration.

After the frequency of oscillation of the lowest subharmonic VCO 27 output signal F matches the frequency, with associated period $T_{EP}$, of the output signal of the infrared sensor 9, a continuing signal phase adjustment begins, which causes the system to track the center of a preselected radiant body, as herein described with reference to FIGS. 2, 6, and 7, for two conditions of system operation. The lowest subharmonic output signal of VCO 27 is represented in FIGS. 6 and 7 by waveforms 60 and 61, for the two distinct conditions of systems operation. An explanation of the two conditions of system operation will exemplify the manner in which the system tracks the center of a preselected radiant astronomical body. In the first condition, the center of the earth 1 is precisely located by the system, so that the lowest subharmonic VCO 27 output signal is locked to the precise center 51 of the output signal of the infrared sensor 9. Such condition can be explained with reference to FIG. 6 by waveform 50, which represents the output signal associated with output lead 49 of the infrared sensor 9 resulting from the infrared input pattern 16 of the earth 1, and the lowest subharmonic output signal VCO waveform 60, which represents the lowest subharmonic VCO output signal F, associated with output lead 59, from the divide-by-N counter device 28. Then the first condition is represented by waveforms 50 and 60, with reference to 51, the precise center of waveform 50, which represents the true location of the center of earth 1. The leading edge 62 of the lowest subharmonic VCO 27 output signal waveform 60 is exactly aligned with 51, the precise center of waveform 50. In such circumstances, there is no phase difference between the precise center 51 of waveform 50 and the leading edge 62 of waveform 60. The electronic earth center tracking logic circuit 20 then transforms the two applied input signals represented by waveforms 50 and 60, respectively, into four gating output signals: positive error gate ($\phi_1$) on output lead 31, represented by waveform 67; negative error gate ($\phi_2$) on output lead 32, represented by waveform 72; reset gate ($\phi_3$) on output lead 33, represented by waveform 84; and transfer gate ($\phi_4$) on output lead 34, represented by waveform 88. For the condition under consideration, the signals positive error gate ($\phi_1$) an output lead 31 and negative error gate ($\phi_2$) on output lead 32 are produced such that, as applied to the error generator 22, no resulting error signal is produced by error generator 22. This signal transformation is represented by waveforms 67, 72, 75, and 76 of FIG. 6. Waveform 72 is initiated by electronic earth tracking logic circuit 20 with the leading edge 55 of waveform 50 and terminated by electronic earth center tracking logic circuit 20 with the leading edge 62 of waveform 60; and waveform 67 is initiated by electronic earth center tracking logic circuit 20 with the leading edge 62 of waveform 60 and terminated by electronic earth center tracking logic circuit 20 with the trailing edge 56 of waveform 50. As negative error gate ($\phi_2$) on output lead 32, represented by waveform 72, is applied to error generator 22, an increasing negative-sloped signal represented by waveform 75 is produced by said error generator 22. As positive error gate ($\phi_1$) on output lead 31, represented by signal waveform 67, is applied immediately upon the termination of the application of negative error gate ($\phi_2$) on output lead 32 to error generator 22, an increasing positive-sloped signal represented by waveform 76 is produced by said error generator 22. For the condition under consideration, wherein the lowest subharmonic VCO 27 output is initially phase locked to the precise center of the output signal of the infrared sensor 51, the duration and slope of the positive-sloped signal represented by waveform 76 is precisely equal to the duration and slope, but opposite in sign, of the negative-sloped signal represented by waveform 75 so that the resultant net effect of positive error gate ($\phi_1$) on output lead 31, and negative error gate ($\phi_2$) on output lead 32, as represented respectively by waveforms 75 and 76, on the system is nil. Consequently, no error signal is produced by error generator 22, since no corrective action is necessary. Reset gate ($\phi_3$) on output lead 33, as represented by waveform 83, is generated by electronic earth center tracking logic circuit 20 to return error generator 22 output signal to zero volts. Reset gate ($\phi_3$) is set to zero by electronic earth tracking logic circuit 20 with the leading edge 55 of waveform 50 and is set positive when transfer gate ($\phi_4$) on output lead 34, as represented by waveform 88, is generated by electronic earth center tracking logic circuit 20 and applied to sample-and-hold (S/H) device 24 to initiate the sample-and-hold sampling process on the error generator 22 output signal. Without signal transfer gate ($\phi_4$) on output lead 34, the error signals produced by error generator 22 are ignored. Signal transfer gate ($\phi_4$) occurs only when the pulse width 50 of the output signal of the infrared sensor 9 is (1) of sufficient duration to be associated with the infrared spectrum of the earth, and (2) terminated for the current cycle, as associated with period $T_{EP}$. The duration of pulse width 88 is on the order of several milliseconds.

In the second condition of operation, the center of the earth initially is not accurately located by the system, so that the lowest subharmonic VCO 27 output signal F is not locked to the center 51 of output signal 50 of infrared sensor 9. Such condition can be explained with reference to FIG. 7 by waveforms 50 and the lowest subharmonic VCO signal waveform 61. Then the second condition is represented by waveforms 50 and 61, with reference to 51. For this condition, the leading edge 64 of the lowest subharmonic VCO 27 output signal waveform 61 is in misalignment with 51, the precise center of waveform 50. In such circumstance, error quantity $\epsilon$ has some definite value, indicating a difference in phase angle between the precise center 51 of waveform 50 and the leading edge 64 of waveform 61. The electronic earth center tracking logic circuit 20 then transforms the two applied input signals, represented by waveforms 50 and 61 into the hereinbefore described signals associated with the four gating signals. For the condition presently under consideration, positive error gate ($\phi_1$) on output lead 31 and negative error gate ($\phi_2$) on output lead 32 are produced by electronic earth center tracking logic circuit 20 such that, as applied to the error generator 22, a resulting error signal is produced and thereafter applied to sample-and-hold (S/H) device 24. This signal transformation is represented by waveforms 66, 74, 77, and 78 of FIG. 7. Waveform 74 is initiated by electronic earth center tracking logic circuit 20 with the leading edge 55 of waveform 50 and is terminated by earth center tracking logic circuit 20 with the falling edge 64 of waveform 61; and waveform 66 is initiated by earth tracking circuit 20 with the falling edge 64 of waveform 61 and terminated with the trailing edge 56 of waveform 50. As negative error gate ($\phi_2$) on output lead 32, represented by waveform 74, is applied to error generator 22, an increasing negative-sloped signal represented by waveform 77 is produced by error generator 22. As the signal associated with the positive error gate ($\phi_1$) on output lead 31, represented by waveform 66, is applied immediately upon the termination of the application of negative error gate ($\phi_2$) on output lead 32 to error generator 22, an increasing positive-sloped signal represented by waveform 78 is produced by error generator 22. In the condition of operation under consideration, wherein the VCO 27 output is not locked to the center 51 of the output signal of infrared sensor 91, the duration of the positive-sloped signal represented by waveform 78 is shorter than that of the negative-sloped signal represented by waveform 77, and opposite in sign, so as to produce a resultant error generator 22 signal and to compensate for the error $\epsilon$, thereby directing the correction of the system pointing error. It thereby follows that a longer duration of negative-sloped signal relative to positive-sloped signal results in reducing the period of the VCO 27 lowest subharmonic output signal whereas a longer duration of positive-sloped signal results in increasing the period of the VCO 27 lowest subharmonic output signal.

Waveform 81 is associated with the count width (W) signal which indicates whether the trailing edge, such as 56 of waveform 50 and 58 of waveform 52 for example, of each infrared sensor output signal, such as that associated with waveform 50 and that associated with waveform 52, is sufficiently far from the leading edge, such as 55 of waveform 50 and 57 of waveform 52 for example, to be an infrared signal resulting from the infrared spectrum of the earth 1. If waveform 81 remains low during the entire duration of a pulse associated with the infrared sensor output signal resulting from the infrared spectrum of a radiant body, the infrared sensor output signal is too narrow to be an infrared signal associated with the earth 1, as is the case for waveform 52. A counter device within electronic earth tracking logic circuit 20 counts a specific number of pulses applied thereto by timing clock generator 8 on lead 39, which represents the duration of a pulse 50 resulting from infrared spectrum 16 of the earth 1. The counting device is initiated by the leading edge 55 or 57 of infrared sensor output signal 50 and 52, respectively. Pulses from infrared sensor 9 applied to earth center tracking logic circuit 20 whose durations are shorter than the time required to count the pulses applied by timing clock generator 8 are too short to represent pulses resulting from infrared spectrum 16 of the earth 1, and are, therefore, ignored by the system. The count width (W) signal thereby provides rejection of moon and sun infrared spectra.

Figure 8:
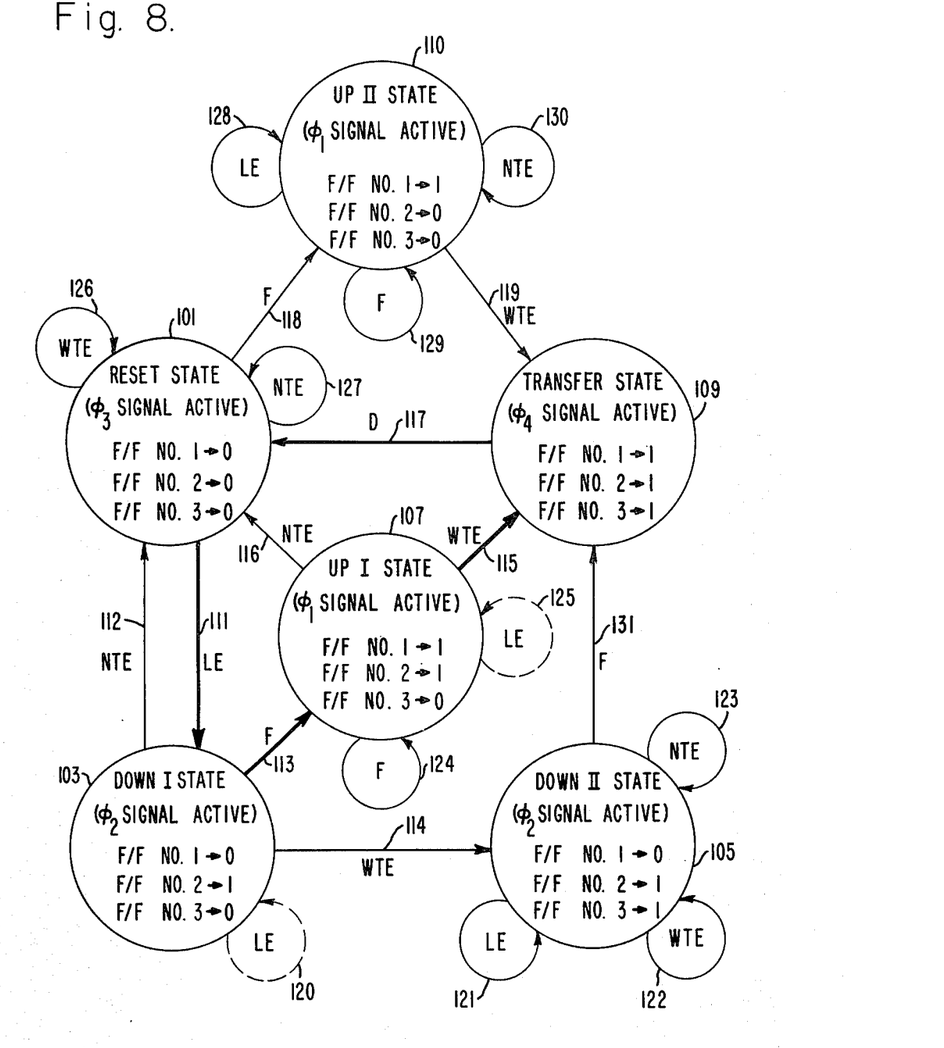
FIG. 8 is a state transition diagram and associated state transition definitions which describe the operation of the device in accordance with the teachings of the present invention.

In FIG. 8, a state transition diagram of the system represents the operation of the system, including the means for earth center tracking, the means for the rejection of undesirable input signals which are external to a preselected pulse width, and the means for reducing a large initial frequency difference between the input and the output signals of the phase locked horizon sensor electronic loop. The transition states involved are referenced as: Reset state 101, Down I state 103, Down II state 105, Up I state 107, Up II state 110, and Transfer state 109. Referring now to FIGS. 2, 6, 7, and 8, Reset state 101 is associated with an active value of reset gate ($\phi_3$) on output lead 33, represented by waveforms 83, 84, and 86. Up I state 107 and Up II state 110 are associated with an active value of positive error gate ($\phi_1$) on output lead 31, represented by waveforms 66 and 67. Down I state 103 and Down II state 105 are associated with an active value of negative error gate ($\phi_2$) on output lead 32, respresented by waveforms 72 and 74. Transfer state 109 is associated with an active value of transfer gate ($\phi_4$) on output lead 34, represented by waveform 88. An active value of a gate signal occurs when the signal is a positive value (or "high"), as opposed to a zero value (or "low").

The Up II and Down II states are related to the operation of the frequency correction capability of the invention. The Up I and Down I states deal with the signal phase angle adjustment which implements the earth center tracking feature of the invention.

Referring again to FIGS. 2, 6, 7, and 8, the system is initialized in Reset state 101. A leading edge of an infrared sensor 9 output signal waveform, such as 55 of waveform 50 or 57 of waveform 52, causes transition 111 (denoted LE on FIG. 8) to occur, to Down I state 103. While the system is in the Down I state 103, negative error gate ($\phi_2$) on output lead 32, represented by waveforms 72 and 74, is generated by earth center tracking logic circuit 20. From Down I state 103, transitions 112, 113, 114, and 120 occur, depending upon the following conditions. When the trailing edge of a signal waveform, which waveform is of shorter duration than that of the resulting output signal waveform 50 from the infrared input pattern 16 of the earth, represented by 58 of waveform 52, is applied on output lead 49 of infrared sensor 9 to electronic earth center tracking logic circuit 20, transition 112 (denoted NTE on FIG. 8) occurs, placing the system in the Reset state 101. When the falling edge represented by 62 or 64 of waveforms 60 and 61, respectively, of the lowest subharmonic signal F of VCO 27 on output lead 59 is applied to electronic earth tracking logic circuit 20, transition 113 (denoted F on FIG. 8) occurs, placing the system in the Up I state 107. When the trailing edge of the signal respresented by 56 of waveform 50, on output lead 49 of infrared sensor 9, is applied to electronic earth center tracking logic circuit 20, transition 114 (denoted WTE on FIG. 8) occurs, placing the system in the Down II state 105. When the leading edge of the signal represented by either 55 or 57 of waveforms 50 and 52, respectively, on output lead 49 of infrared sensor 9 is applied to electronic earth center tracking logic circuit 20, transition 120 (denoted LE on FIG. 8) occurs, so that the system remains in the Down I state 103. Note that transition 120 cannot occur in normal operation (denoted by the dashed transition path in FIG. 8 for transition 120), except for the time when power is initially applied to the system, when the system can start in an arbitrary state.

While the system is in the Down II state 105, negative error gate ($\phi_2$) on output lead 32, represented by waveforms 72 and 74, is generated by earth center tracking logic circuit 20. From Down II state 105, transitions 131, 121, 122, and 123 may occur, depending upon the following conditions. When the falling edge, represented by 62 or 64 of waveforms 60 and 61, respectively, of the lowest subharmonic signal F of VCO 27 on output lead 59 is applied to electronic earth center tracking logic circuit 20, transition 131 (denoted F on FIG. 8) occurs, placing the system in the Transfer state 109. When the leading edge of an infrared sensor output signal waveform, such as 55 of waveform 50 or 57 of waveform 52, is applied to electronic earth center tracking logic circuit 20, the system remains in Down II state 105, as indicated by transition 121 (denoted LE on FIG. 8). When the trailing edge of the signal represented by 56 of waveform 50, on output lead 49 of infrared sensor 9, is applied to electronic earth center tracking logic circuit 20, transition 122 (denoted WTE on FIG. 8) occurs, so that the system remains in the Down II state 105. When the trailing edge of a signal waveform, which waveform is of shorter duration than that of the resulting output signal waveform 50 from the infrared pattern 16 of the earth, represented by 58 of waveform 52, is applied on output lead 49 of infrared sensor 9 to electronic earth center tracking logic circuit 20, the system remains in Down II state 105, as indicated by transition 123 (denoted NTE on FIG. 8).

While the system is in the Up I state 107, positive error gate ($\phi_1$) on output lead 31, represented by waveforms 66 and 67, is generated by earth center tracking logic circuit 20. From the Up I state 107, transitions 115, 116, 124, and 125 occur, depending upon the following conditions. When the trailing edge of the signal represented by 56 of waveform 50, on output lead 49 of infrared sensor 9 is applied to electronic earth center tracking logic circuit 20, transition 115 (denoted WTE on FIG. 8) occurs, placing the system in the Transfer state 109. When the trailing edge of a signal waveform, which waveform is of shorter duration than that of the resulting output signal waveform 50 from the infrared pattern 16 of the earth, represented by 58 of waveform 52 is applied on output lead 49 of infrared sensor 9 to electronic earth center tracking logic circuit 20, transition 116 (denoted NTE on FIG. 8) occurs, placing the system in the Reset state 101. When the falling edge, represented by either 62 or 64 of waveforms 60 and 61, respectively of the lowest subharmonic signal F of VCO 27 on output lead 59 is applied to electronic earth center tracking logic circuit 20, transition 124 (denoted F on FIG. 8) occurs, so that the system remains in the Up I state 107. When the leading edge of the signal represented by either 55 or 57 of waveforms 50 and 52, respectively, on output lead 49 of infrared sensor 9 is applied to electronic earth center tracking logic circuit 20, transition 125 (denoted LE on FIG. 8) occurs, so that the system remains in the Up I state 107. Note that transition 125 cannot occur in normal operation (denoted by the dashed transition path in FIG. 8 for transition 125), except for the time when power is initially applied to the system.

While the system is in the Up II state 110, positive error gate ($\phi_1$) on output lead 31, represented by waveforms 66 and 67, is generated by earth center tracking logic circuit 20. From the Up II state 110, transitions 119, 128, 129, and 130 occur, depending upon the following conditions. When the trailing edge of the signal represented by 56 of waveform 50, on output lead 49 of infrared sensor 9 is applied to electronic earth center tracking logic circuit 20, transition 119 (denoted WTE on FIG. 8) occurs, placing the system in the Transfer state 109. When the leading edge of the signal represented by either 55 or 57 of waveforms 50 and 52, respectively, on output lead 49 of the infrared sensor 9 is applied to electronic earth center tracking logic circuit 20, transition 128 (denoted LE on FIG. 8) occurs, so that the system remains in the Up II state 110. When the falling edge, represented by either 62 or 64 of waveforms 60 and 61, respectively, of the lowest subharmonic signal F of VCO 27 on output lead 59 is applied to electronic earth center tracking logic circuit 20, the system remains in the Up II state 110, as indicated by transition 129 (denoted F in FIG. 8). When the trailing edge of a signal waveform, which waveform is of shorter duration than that of the resulting output signal waveform 50 from the infrared pattern 16 of the earth, represented by 58 of waveform 52, is applied on output lead 49 of infrared sensor 9 to electronic earth tracking logic circuit 20, transition 130 (denoted NTE in FIG. 8) occurs, so that the system remains in the Up II state 110.

While the system is in the Transfer state 109, transfer gate ($\phi_4$) on output lead 34 represented by waveform 88, is generated by earth center tracking logic circuit 20. When the system enters the Transfer state 109, transfer 117 (denoted D on FIG. 8) occurs, after a delay of several milliseconds, placing the system in the Reset state 101.

While the system is in the Reset state 101, reset gate ($\phi_3$) on output lead 33 is generated by earth center tracking logic circuit 20. From Reset state 101, transitions 118, 126, 127, and 111 occur, depending upon the following conditions. When the falling edge, represented by either 62 or 64 of waveforms 60 and 61, respectively, of the lowest subharmonic signal F of VCO 27 on output lead 59 is applied to electronic earth center tracking logic circuit 20, transition 118 (denoted F on FIG. 8) occurs, placing the system in the Up II state 110. When the trailing edge, represented by 56 of waveform 50, of the signal on output lead 49 of infrared sensor 9 is applied to electronic earth center tracking logic circuit 20, transition 126 (denoted WTE on FIG. 8) occurs, so that the system remains in the Reset state 101. When the trailing edge of a signal waveform, which waveform is of shorter duration that that of the resulting output signal waveform 50 from the infrared input pattern 16 of the earth, represented by 58 of waveform 52, is applied on output lead 49 of infrared sensor 9 to electronic earth center tracking logic circuit 20, transistion 127 (denoted NTE in FIG. 8) occurs, so that the system remains in the Reset state 101. Transition 111 (denoted LE in FIG. 8), in which the system is placed into the Down I state 103 from the Reset state 101, has been previously described herein.

The system transitions into the Up II and Down II states to provide frequency correction of the system output signals. Up II state 110 is entered by the system to decrease the oscillation frequency signal of VCO 27, as was previously described with reference to FIG. 4. Up II state 110 is entered from another system state, Reset state 101, only when the system is in Reset state 101 and the falling edge 64 of the lowest subharmonic VCO output signal F, represented by waveform 61, is applied to earth center tracking logic circuit 20. Such condition occurs when the falling edge 64 of waveform 61 is applied to earth center tracking logic circuit 20 prior to the application of leading edge 55 of infrared sensor 9 output signal, represented by waveform 50, to the system. Transition from Up II state 110 to Transfer state 109 occurs only when the trailing edge 56 of infrared sensor 9 output signal resulting from the infrared pattern 16 of the earth 1, represented by waveform 50, occurs. Such transition occurs when the frequency of the lowest subharmonic VCO 27 signal is the same as that of the infrared sensor 9 output signal resulting from the pattern 16 of the earth 1 applied to the system; that is, the falling edge 64 of the lowest subharmonic VCO output signal F, represented by waveform 61, is applied to earth center tracking logic circuit after the leading edge 55 of the infrared sensor output signal, represented by waveform 50, is applied to the system and before the trailing edge 56 of the infrared sensor output signal occurs. Down II state 105 is entered by the system to increase the oscillation frequency signal of VCO 27, as was previously described with reference to FIG. 5. Down II state 105 is entered from another system state, Down I state, only when the system is in Down I state 103 and the trailing edge 56 of infrared sensor 9 output signal resulting from the infrared pattern 16 of the earth, represented by waveform 50, is applied to the system. Such condition occurs when the trailing edge 56 of the infrared sensor 9 output signal resulting from the infrared pattern 16 of the earth, occurs before the falling edge 64 of the lowest subharmonic frequency of VCO 27 output signal F, represented by waveform 61, is applied to earth center tracking logic circuit 20. Transition from Down II state 105 to Transfer state 109 occurs only when the falling edge 64 of the lowest subharmonic frequency VCO 27 output signal F, represented by waveform 61, is applied to earth center tracking logic circuit 20. Such transition occurs when the frequency of the lowest subharmonic VCO 27 signal F is the same as that of the infrared sensor 9 output signal resulting from the infrared pattern 16 of the earth 1 applied to the system; that is, the falling edge 64 of the lowest subharmonic VCO output signal, represented by waveform 61, is applied to earth center tracking logic circuit 20 before the trailing edge 56 of the infrared sensor output signal, represented by waveform 50, occurs, and after the leading edge 55 of the infrared sensor 9 output signal, represented by waveform 50, is applied to the system.

The repetitive system state transition path which occurs after frequency correction has been achieved is from Reset state 101 to Down I state 103, via transition 111, to Up I state 107, via transition 113, to Transfer state 109, via transition 115, back to Reset state 101, via transition 117. The transition arrows symbolizing this particular sequence of state transitions are emphasized with bold lines in FIG. 8. When the system is in the phase lock condition, the system remains in the Up I state 107, producing waveform 75, fo precisely the same amount of time as it remains in the Down I state 103, producing waveform 76. In general, when the lowest subharmonic VCO 27 output signal is not locked to the center 51 of the output signal of the infrared sensor 9 resulting from the infrared pattern 16 of the earth, so that error $\epsilon$ has some definite value, the hereinbefore described state transition path is executed, with the following provisions. When the falling edge 64 of the lowest subharmonic VCO 27 output signal F, represented by waveform 61, occurs after the precise center 51 of infrared sensor 9 output signal, represented by waveform 50, the Up I state 107 will be of shorter duration, producing waveform 78, than the Down I state 103, producing waveform 77, as was hereinabove described for the second condition of system operation. As previously described, this produces a negative error transfer in the system so as to reduce the error quantity ε, thereby correcting the phase angle error. When the falling edge 64 of the lowest subharmonic VCO 27 output signal F occurs prior to the precise center 51 of infrared sensor 9 output signal, represented by waveform 50, the Up I state 107 will last longer than the Down I state 103. This produces a positive error transfer in the system so as to reduce the error quantity ε, thereby correcting the phase error.

Figure 9:
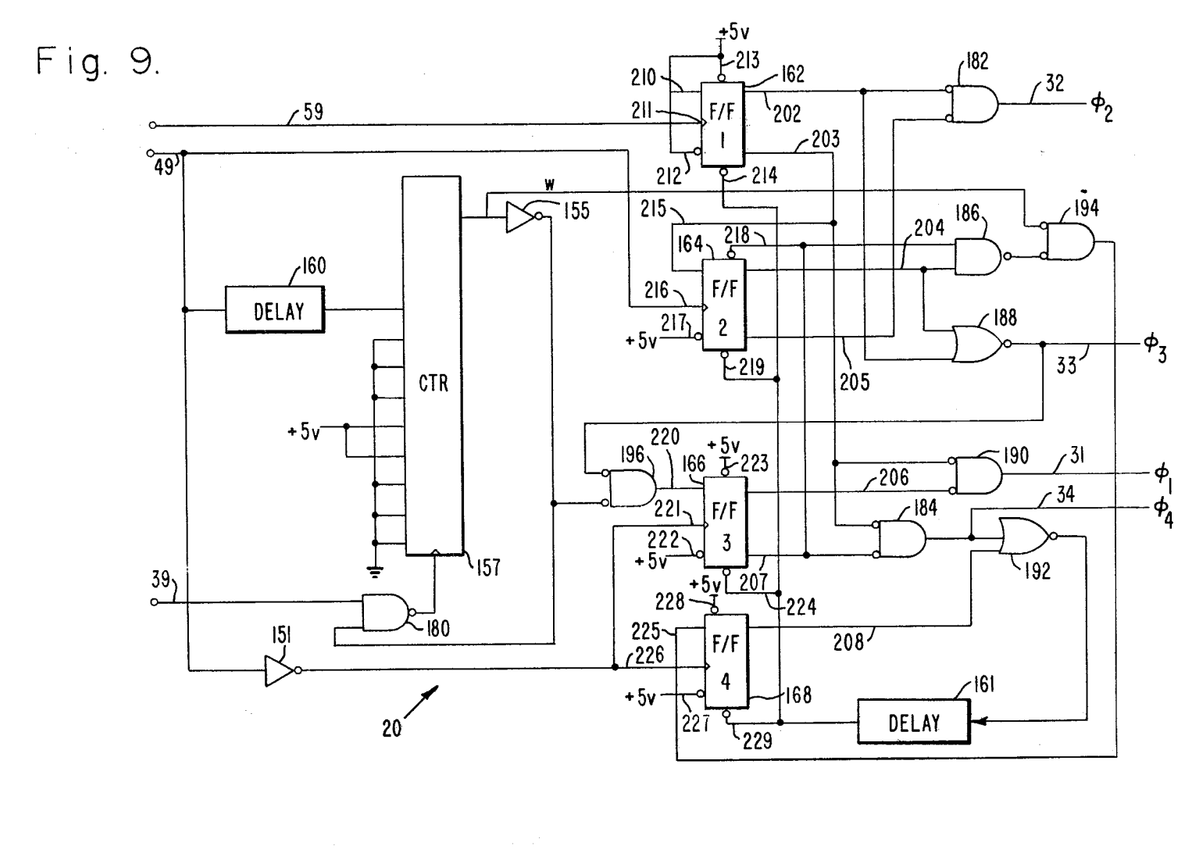
FIG. 9 is an example of a schematic diagram of an earth center tracking logic circuit in accordance with the teachings of the present invention.

The above-described system states are mechanized by flip-flops 162 (F/F #1), 164 (F/F #2), and 166 (F/F #3) of FIG. 9. The table below defines the states of operation of the system in accordance with the two states (0 and 1) of the output signals associated with said three flip-flops.

| SYSTEM STATE NAME | SYSTEM FLIP-FLOP REFERENCE STATES | | |
|---|---|---|---|
| | Flip-Flop 162 (F/F #1) Q Output (on lead 202) | Flip-Flop 164 (F/F #2) Q Output (on lead 204) | Flip-Flop 166 (F/F #3) Q Output (on lead 206) |
| RESET | 0 | 0 | 0 |
| FORBIDDEN* | 0 | 0 | 1 |
| DOWN I | 0 | 1 | 0 |
| DOWN II | 0 | 1 | 1 |
| UP II | 1 | 0 | 0 |
| FORBIDDEN* | 1 | 0 | 1 |
| UP I | 1 | 1 | 0 |
| TRANSFER | 1 | 1 | 1 |

*Forbidden by logical connection of flip-flop (F/F #3) output to flip-flop (F/F #4) preset input.

Recall that the two Up states, Up I and Up II, cause a positive error gate ($\phi_1$) signal to be generated and the two Down states, Down I and Down II, cause a negative error gate ($\phi_2$) signal to be generated, as described in FIGS. 6 and 7.

Figure 10:
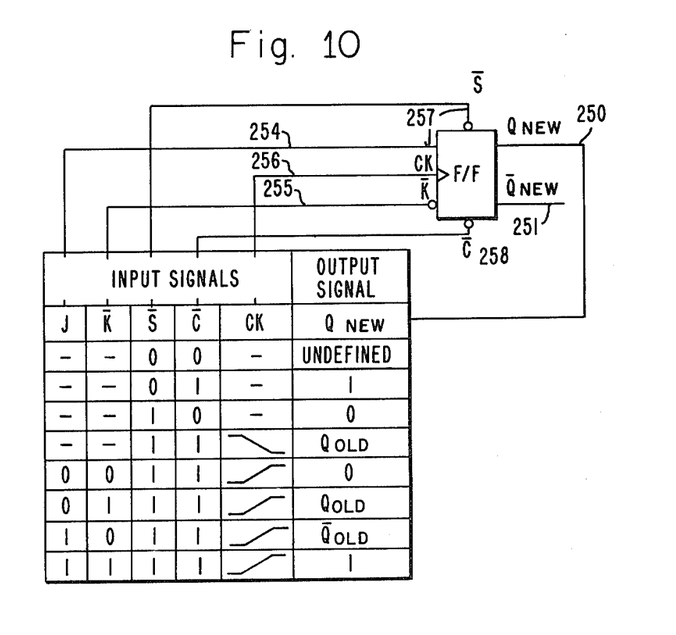
FIG. 10 is a schematic diagram illustrating the details and defining the states of the flip-flops used in the schematic diagram of FIG. 9.
Figure 11A:
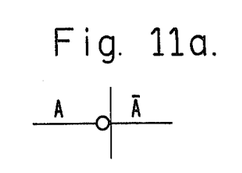
FIGS. 11a–11e are diagrams which describe and define the electronic logic components, other than the flip-flops, which comprise the earth center-tracking logic circuit shown in FIG. 9.
Figure 11B:
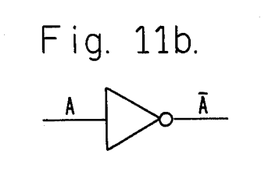
Figure 11C:
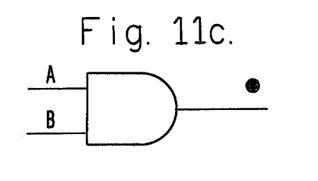
Figure 11D:
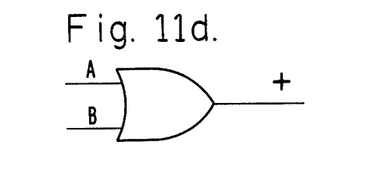
Figure 11E:
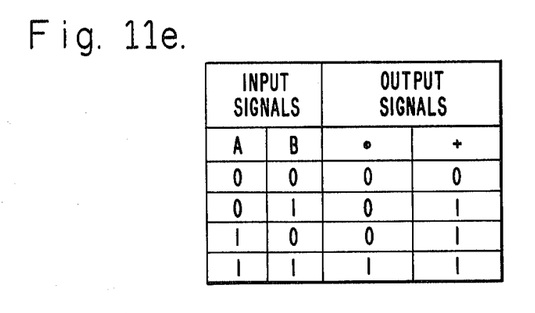

The settings of the output signals of flip-flop 162 (F/F #1), flip-flop 164 (F/F #2), and flip-flop 166 (F/F #3) with respect to the above Flip-Flop Reference States table and the state transition diagram of FIG. 8 are now described for the repetitive system state transition path which occurs after frequency correction has been achieved, as hereinbefore discussed. FIG. 10 defines the operation of said flip-flops in terms of input signals and output signals. The input signals are J, on input lead 254; $\overline{K}$, on lead 255; CK, on flip-flop trigger input lead 256; $\overline{S}$ on flip-flop "set" input lead 257; and $\overline{C}$, on flip-flop "clear" input lead 258. The output signals of the flip-flop are $Q_{NEW}$, on output lead 250; and the logical complement of $Q_{NEW}$, $\overline{Q_{NEW}}$, on output lead 251.

Referring to FIGS. 8, 9, and 10, the system is initialized in Reset state 101, wherein the output signal of delay device 161 is 0. Consequently, the output signal of flip-flop 162 (F/F #1) on output lead 202 is 0 and is 1 on output lead 203, because the signal on input lead 213 is 1 and 0 is on input lead 214; the output signal of flip-flop 166 (F/F #3) on output lead 206 is 0 and is 1 on output lead 207, because the signal on input lead 223 is 1 and 0 is on input lead 224; the output signal of flip-flop 164 (F/F #2) on output lead 204 is 1 and is 0 on output lead 205, because the signal on input lead 218 is 1 and is 0 on input lead 219. When the leading edge of an infrared sensor 9 output signal is applied at lead 49 to earth center tracking logic circuit 20, flip-flop 164 (F/F #2) is triggered on input lead 216 and flip-flop 166 (F/F #3) is triggered on input lead 221. Since the signal input on lead 215 is 1 and the signal input on lead 217 is 1, flip-flop 164 (F/F #2) output signal on lead 204 is 1 and is 0 on output lead 205. The signals output from flip-flop 166 (F/F #3) maintain the same value as they were prior to the applied signal at lead 49. The signals output from flip-flop 162 (F/F #1) remain unaffected by the applied signal at lead 49. Therefore, the output signal for flip-flop 164 (F/F #2) is 0 on output lead 202; the output signal for flip-flop 164 (F/F #2) is 1 on output lead 204; and the output signal for flip-flop 166 (F/F #3) is 0 on output lead 206. This precise combination of flip-flop output signals defines the Down I state 103 of the system. When the falling edge of the lowest subharmonic signal F of VCO 27 is applied at lead 59 to earth center tracking logic circuit 20, flip-flop 162 (F/F #1) is triggered on input lead 211. Since the signal input on lead 210 is 1 and the signal input on lead 212 is 1, flip-flop 162 (F/F #1) output signal on lead 202 is 1 and is 0 on output lead 203. The signals output from flip-flop 164 (F/F #2) and from flip-flop 166 (F/F #3) remain unaffected by the applied signal at lead 49. Therefore, the output signal for flip-flop 164 (F/F #1) is 1 on output lead 202; the output signal for flip-flop 164 (F/F #2) is 1 on output lead 204; and the output signal for flip-flop 166 (F/F #3) is 0 on output lead 206. It is this precise combination of flip-flop output signals that defines the Up I state 107 of the system. When the trailing edge of an output signal from infrared sensor 9 resulting from the infrared pattern 16 of the earth is applied at lead 49 to earth center tracking logic circuit 20, flip-flop 166 (F/F #3) is triggered on input lead 221. Since the signal input on lead 220 is 1, which occurs for signals output from infrared sensor 9 resulting from the infrared pattern 16 of the earth, and the signal input on lead 222 is 1, flip-flop 166 (F/F #3) output signal on lead 206 is 1 and is 0 on output lead 207. The signals output from flip-flop 164 (F/F #2) and from flip-flop 162 (F/F #1) remain unaffected by the signal applied at lead 49. Thus the output signal for flip-flop 162 (F/F #1) is 1 on output lead 202; the output signal for flip-flop 164 (F/F #2) is 1 on output lead 204; and the output signal for flip-flop 166 (F/F #3) is 1 on output lead 206. This precise combination of flip-flop output signals defines the system Transfer state 109. When the output signal for flip-flop 162 (F/F #1) on lead 202 is 1, so that the output signal on lead 203 is 0, and the output signal for flip-flop 166 (F/F #3) on lead 206 is also 1, so that the output signal on lead 207 is 0, which simultaneously occurs only in the system Transfer state 109, after a delay of several milliseconds produced by delay device 161, flip-flop 162 (F/F #1) output signal on lead 202 is set to 0; flip-flop 164 (F/F #2) output signal on lead 204 is set to 0; and flip-flop 166 (F/F #3) output signal on lead 206 is set to 0. Thus the system re-enters Reset state 101.

Referring again specifically to the waveforms of FIGS. 6 and 7, the mechanization of the flip-flops in the electronic earth tracking logic circuit 20 will now be summarized to complete the understanding of the system state and flip-flop reference states. The first output signal of flip-flop 162 (F/F #1), on output lead 202, which is represented by waveforms 91 and 96, is 1 when the system is in the Up I, Up II and Transfer states, as hereinafter defined by the applied input signals to flip-flop 162 (F/F #1). The second output signal of flip-flop 162 (F/F #1), on output lead 203, is the logical inverse (0) of the first output signal of flip-flop 162 (F/F #1), and its waveform would be represented by the complement of that shown for the F/F #1 output signal in FIG. 6 and 7. The first output signal of flip-flop 164 (F/F #2), on output lead 204, which is represented by waveforms 92 and 93, 97 and 98, is 1 when the system is in the Down I, Down II, Up I, and Transfer states, as hereinafter defined by the applied input signals to flip-flop 164 (F/F #2). The second output signal of flip-flop 164 (F/F #2), on lead 205, is the logical inverse (0) of the first output signal of flip-flop 164 (F/F #2), and its waveform would be represented by the complement of that shown for the F/F #2 output signal in FIGS. 6 and 7. The first output signal of flip-flop 166 (F/F #3), on output lead 206, which is represented by waveforms 94 and 99, is 1 when the system is in the Down II and Transfer states, as hereinafter defined by the applied input signals to flip-flop 166 (F/F#3). The second output signal of flip-flop 166 (F/F #3), on output lead 207, is the logical inverse (0) of the first output signal of flip-flop 166 (F/F #3), and its waveform would be represented by the complement of that shown for F/F #3 in FIGS. 6 and 7. The single output signal of flip-flop 168 (F/F #4), on output lead 208, which is represented by waveform 95 and 100, is 1 when a signal from infrared sensor 9 is applied to earth center tracking logic circuit 20 which signal is of shorter duration than such a signal which represents the input infrared spectra from the earth 1. Said output flip-flop signal is generated near the conclusion of such a signal applied from infrared sensor 9.

Referring now primarily to the schematic diagram shown in FIG. 9, as there shown electronic earth tracking logic circuit 20 consists of a combination of inverters 151 and 155, delay devices 160 and 161, counter device 157, flip-flops 162 (F/F #1), 164 (F/F #2), 166 (F/F #3), and 168 (F/F #4), and associated logic gates. In practice inverters commercial component 54LS04 can be used for 151 and 155, and commercial component 193 can be used for counter device 157. Commercial component 54L193 can be used for delay devices 160 and 161, and commercial component 54LS109 can be used for flip-flops 162, 164, 166, and 168. Commercial component 54L00 can be used for the NAND logic gates and 54LS02 can be used for the NOR logic gates.

Output signal of infrared sensor 9 associated with satellite 10 is applied on lead 49 and inverted by inverter 151 and applied as the trigger input signal of flip-flop 166 (F/F #3), on lead 221, and of flip-flop 168 (F/F #4), on lead 226. Said signal is also applied to delay device 160 and to flip-flop 164 (F/F #2) as the trigger input signal. Delay device 160 functions to control the width of the signal waveform 88 associated with transfer gate ($\phi_4$) on output lead 34. Delay device 160 produces a pulse width which is small in comparison to the pulse width associated with the infrared pattern 16 of the earth 1 as produced by infrared sensor 9. The output signal of delay device 160 is applied to counter device 157 which counts when this signal is 1 and returns to the initial state when the signal is 0. The output signal of timing clock generator 8 is also applied to counter device 157 through gate 180 to serve as the count input signal. Counter device 157 is pre-programmed to count up to a specific vlue which corresponds precisely to the minimum width of signals applied from infrared sensor 9, which width is deemed to be a signal resulting from the infrared pattern 16 of the earth. Said timing signal on lead 39 as applied from timing clock generator 8 provides the means for said counting. Thus counter device 157 produces the pulse width discriminator gate signal (W) as depicted by associated waveform 81. When said counter device 157 produces an output signal which remains 0, the applied input pulse is too narrow to be a signal resulting from the infrared pattern 16 of the earth. The output signal from counter device 157 is applied to inverter 155 and to gate 194. The output signal of inverter 155 is applied to gate 180 and gate 196. VCO 27 output signal on lead 59 is applied to flip-flop 162 (F/F #1), on input lead 211 as the trigger signal, a constant voltage signal of positive value is applied on input lead 210 as supplied by a +5 volt supply, and a constant signal of zero volts is applied on input lead 212 of flip-flop 162 (F/F #1).

Output signal on lead 202 of flip-flop 162 (F/F #1) is applied to gates 182 and 188; the second output signal, on lead 203 is applied to gates 184 and 190, and is also applied on lead 215 of flip-flop 164 (F/F #2). The input signal from infrared sensor 9 is applied on lead 49 to flip-flop 164 (F/F #2) on lead 216 as the trigger input signal; an output signal on lead 203 from flip-flop 162 (F/F #1) is applied on lead 215 to flip-flop 164 (F/F #2), and also a constant signal of zero volts is applied on lead 217 to flip-flop 164 (F/F #2). Output signal on lead 204 of flip-flop 164 (F/F #2) is applied to gates 186 and 188; the inverted output signal, on lead 205, of flip-flop 164 (F/F #2) is applied to gate 182. The inverse of input signal from infrared sensor 9 is applied to flip-flop 166 (F/F #3) as the trigger input signal, the output signal from gate 196 is applied to flip-flop 166 (F/F #3), on lead 220; and a constant signal voltage of zero is applied to flip-flop 166 (F/F #3), on leads 222 and 223. An output signal on lead 206 of flip-flop 166 (F/F #3) is applied to gate 190; the inverse output signal, on lead 207 is applied to gate 184. The inverse of input signal from infrared sensor 9 is applied on lead 226 to flip-flop 168 (F/F #4) as the trigger input signal; output signal of gate 194 is applied to flip-flop 168 (F/F #4); and a constant signal of zero voltage is applied on lead 228 to flip-flop 168 (F/F #4). Also a +5 volt signal is applied on lead 227 to flip-flop 168 (F/F #4). The output signal of flip-flop 168 (F/F #4) is applied on lead 208 to gate 192. The output signal from delay device 161 is used as the clearing input signal applied to flip-flop 162 (F/F #1) on lead 214, to flip-flop 164 (F/F #2) on lead 219, to flip-flop 166 (F/F #3) on lead 224, and also to flip-flop 168 (F/F #4) on lead 229. Flip-flops 162 (F/F #1), 164 (F/F #2), and 166 (F/F #3) operate to define the state of the logic, as previously defined in the System Flip-Flop Reference States table, for the operation of the device, as described by FIG. 8 and reference made thereto.

The output signal of gate 180 is applied to counter device 157. The output signal of gate 186 is applied to gate 194. The output signal of gate 194 is applied on lead 225 to the input of flip-flop 168 (F/F #4). The output signal of gate 196 is applied on lead 220 to flip-flop 166 (F/F #3). The output signal of gate 192 is applied to delay device 161. The output signal of gate 190 is positive error gate ($\phi_1$) on output lead 31, represented by waveforms 66 and 67, which is applied to error generator 22. The output signal of gate 182 is negative error gate ($\phi_2$) on output lead 32, represented by waveforms 72 and 74, which is applied to error generator 22. The output signal of gate 188 is applied to gate 196 and said output is also reset gate ($\phi_3$) on output lead 33, represented by waveforms 83, 84, and 86. The output signal of gate 184 is applied to gate 192 and said output is also transfer gate ($\phi_4$) on output lead 34, represented by waveform 88.

To those skilled in the art, it should be apparent that the implementation of the above-described embodiment could be varied without departing from the scope of the invention. In all cases it is understood that the above-described embodiments are merely illustrative of but a small number of the many possible specific embodiments which represent the application of the principles of the present invention. Furthermore, numerous and varied other arrangements can be readily devised in accordance with the principles of the present invention by those skilled in the art without departing from the spirit and scope of the invention.

What is claimed is:

1. An electronic processor circuit which is responsive to applied input signals, which input signals are repetitive and of a known character, for producing a plurality of output signals which are at a higher frequency than, and phase locked to, the input signals, for rejecting undesirable input signals which are external to a preselected pulse width range, and for locating the center of a preselected radiant astronomical body, comprising:

an astronomical center-tracking logic circuit means responsive to said applied input signals and to a feedback signal whose frequency of repetition is to be made the same as said applied input signal and a preselected edge of said feedback signal is to be positioned at the center of said applied input signal, means for producing a first output signal which remains active when the frequency of repetition of said feedback signal is greater than that of said applied input signals, and which is indicative of the duration from the leading edge of said applied input signals to said preselected edge of said feedback signal when the frequency of repetition of said feedback signal is the same as that of said applied input signal, a second output signal which remains active when the frequency of repetition of said feedback signal is less than that of said applied input signal, and which is indicative of the duration from said preselected edge of said feedback signal to the other edge of said applied input signal when the frequency of repetition of said feedback signal is the same as that of said applied input signal, a third output signal indicative of the duration of the absence of said applied input signals, and a means for producing, following said second output signal, a sample pulse only if said applied input signal is within said preselected pulse width range;

an analog error generator means for responding to said first, second, and third output signals from said center-tracking logic circuit means for integrating a constant current down during the duration of said first output signal, integrating a constant current up during the duration of said second output signal, and integrating a zero value current during the duration of said third output signal;

a sample-and-hold circuit gated on by said sample pulse for sampling the output signal of said analog error generator;

a voltage controlled oscillator responsive to said analog error generator sampled output signal for producing an output signal having a high frequency of oscillation;

a divide-by-N means responsive to said high frequency of oscillation signal for producing a plurality of signals of lower frequencies of oscillation, one of which is applied to said center-tracking logic circuit as said feedback signal.

2. The electronic processor circuit of claim 1 further comprising an electronic loop filter means for compensating the frequency response of said electronic processor circuit, said loop filter means coupled to process the output signal of said sample-and-hold circit and coupled to the input of said voltage controlled oscillator.

3. An earth center-tracking logic circuit means which is responsive to applied input signals, which input signals are repetitive and of a known character, and to a feedback signal whose preselected edge is to be positioned at the center of said applied input signals for producing a first output signal indicative of the duration of the difference between a preselected edge of said applied input signals and said preselected edge of said feedback signal, a second output signal indicative of the duration of the difference between said preselected edge of said feedback signal to the other edge of said applied input signals, a third output signal indicative of the duration of the absence of said applied input signals, and a means for producing, following said second output signal, a sample pulse only if said applied input signals are within a preselected pulse width range, comprising:

first means for sensing the duration of the difference between said preselected edge of said applied input signals and the preselected edge of said feedback signal whose said preselected edge is to be positioned at the center of said applied input signals and for producing a signal which indicates the length of said duration;

second means coupled to said first means for sensing the duration of the different between said preselected edge of said feedback signal whose preselected edge is to be positioned at the center of said applied input signals to the other edge of said applied input signals, and for producing a signal which indicates the length of said duration;

third means coupled to said first means and said second means for sensing the duration of the absence of said applied input signals, and for producing a signal which indicates the length of said duration; and fourth means coupled to said first means, said second means, and said third means for sensing whether said applied input signals are within said preselected pulse width range, and producing said sample pulse when said input signals occur.

4. The earth center-tracking logic circuit means of claim 3 wherein said fourth means comprises a counter intercoupled with a clock generator so as to count a preprogrammed number of pulses which corresponds to the range of said preselected pulse width.

* * * * *